(No Model.)

S. BERGMANN.
CONDUIT FOR ELECTRIC WIRING IN BUILDINGS.

No. 447,861. Patented Mar. 10, 1891.

Witnesses
C. R. Furguson
George C. Thomas

Inventor
Sigmund Bergmann
By his Attorney
Edwin H. Brown

UNITED STATES PATENT OFFICE.

SIGMUND BERGMANN, OF NEW YORK, N. Y.

CONDUIT FOR ELECTRIC WIRING IN BUILDINGS.

SPECIFICATION forming part of Letters Patent No. 447,861, dated March 10, 1891.

Application filed August 1, 1890. Serial No. 360,652. (No model.)

*To all whom it may concern:*

Be it known that I, SIGMUND BERGMANN, of New York, in the county and State of New York, have invented a certain new and useful Improvement in Conduits for Electric Wiring in Buildings, of which the following is a specification.

The invention consists in a seat or seats placed at various points in conduits for electric wiring and constructed to receive a switch; and it also consists in the construction and novel arrangement of parts in the switch.

I will describe my invention, and then point out the novel features in the claims.

Figure 1:
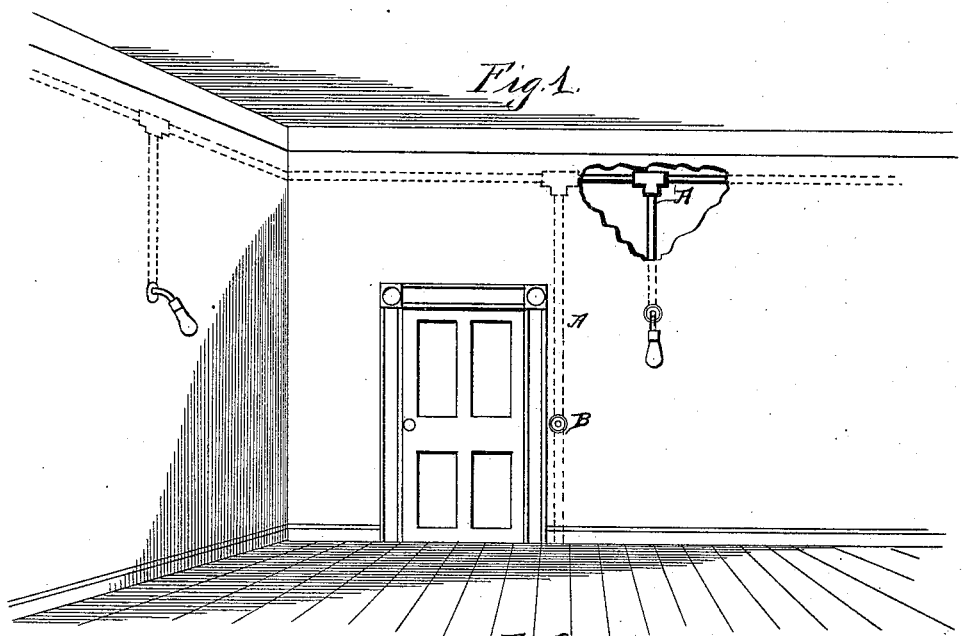
Figure 2:
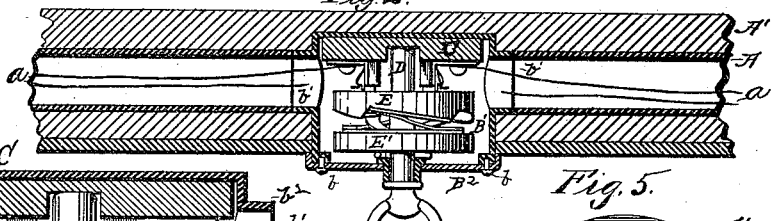
Figure 3:
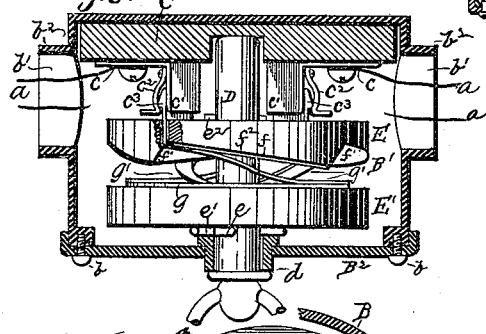
Figure 5:
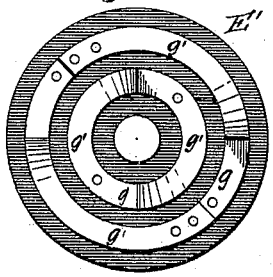
Figure 4:
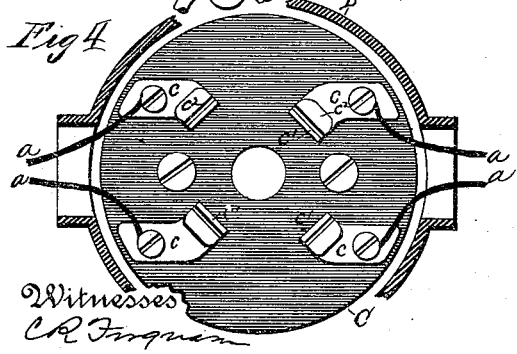
Figure 6:
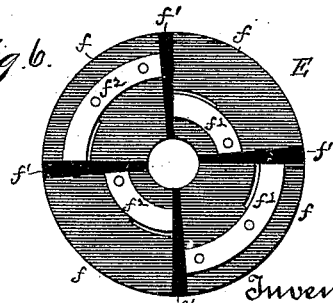

In the accompanying drawings, Figure 1 is a diagrammatic view of a conduit system embodying my invention. Fig. 2 is a sectional view of a wall, conduit, and switch. Fig. 3 is a sectional view of a switch-box with a switch therein. Fig. 4 is a plan of the switch-base block. Figs. 5 and 6 show the switch-wheels.

Similar letters of reference designate corresponding parts in all the figures.

Referring by letter to the drawings, A designates a conduit for wires placed in the masonry A' during the construction of a building. The conduit A is here shown as tubular in form, and it preferably consists of insulating material, such as paper, properly coated to render it water-proof.

B designates a frame seat or box, within which a switch B' may be detachably secured.

The box B may be of any suitable material, such as metal, or it may be of insulating material. It is here shown as substantially cup form, closed at its inner end to exclude dampness from the wall, and having an outward opening provided with a cover $B^2$, which may be secured in place by screws $b$. The box has openings $b'$ in its opposite sides, and tubular projections $b^2$ therefrom registering or engaging with ends of the conduit A, so that the line wires $a$ passing through the conduit may pass into the box and engage with the switch. Of course when it is desirable not to place a switch in a box at a certain point the wires will pass directly through the box. It will be observed that the box B is of such size with relation to the switch that the switch can be wholly withdrawn therefrom. With this arrangement of switches the electrical current may be switched off or on at various points in a building. In Fig. 1 I have shown a switch seat or box at B.

I will now describe a double switch adapted for use in this system.

C designates a base-block, preferably of vitreous material, seated in the inner end of the box B, to which it may be secured by screws or otherwise. Four contact-plates $c$ are secured to the base C by means of binding-screws for the line wires, and these contact-plates have outwardly-extending portions $c'$, which coact with spring-clips $c^2$ thereon to removably engage resilient contacts $c^3$, extending from the switch-plates. I have shown the spring-clips $c^2$ as curved to engage over a head or shouldered portion of the contacts $c^3$, and it will be seen that by loosening the cover $B^2$ the switch may be disengaged from the block C by simply drawing it outward and engaged therewith by pushing it inward. The incline of the heads, as shown in the contacts $c^3$, force the clips away from the portion $c'$.

D designates a rotary shaft or post extending through an opening in the cover $B^2$ and having a bearing at its end in the base-block C. A bushing $d$ of insulating material may surround the shaft D within the opening in the cover.

E E' designate switch-wheels of suitable insulating material, loosely mounted on the shaft D. When the contacts $c^3$ are in engagement with the plates $c$, the wheel E remains stationary, but the wheel E' is intended to rotate with the shaft D when the shaft is turned in one direction. To cause the wheel E' to turn with the shaft, the shaft is provided with a pin $e$, which bears against one side of pins $e'$, extending outwardly from the wheel. A pin $e^2$, passing through the shaft D and bearing against the wheel E, prevents said wheel from moving lengthwise of the shaft. The pin $e^2$ passes through a transverse hole in the shaft and may be withdrawn therefrom when it is desired to remove the wheels E E' from the shaft. I have designated the parts E E' as wheels; but they are supports for metal portions of the switch and may be of any desired contour.

The wheel E has four inclined or cam surfaces $f$ and radial shoulders $f'$ on its inner face. Each of the cam-surfaces $f$ has a curved or segmental contact-plate $f^2$ secured to it, and the respective contacts $c^3$ pass through openings in the wheel and engage with the plates $f^2$. In Fig. 3 I have shown the contacts $c^3$ as being an integral portion of the plate $f^2$. It will be seen that two opposite plates $f^2$ are inside of the circular line of the other plates, or, in other words, the plates are in two circles, and there is an insulated space between adjacent ends of the plates of each circle.

The wheel E′ has attached to it two concentric metal rings $g$, and resilient contacts $g'$ are attached to the rings. The contacts $g'$ are curved in the arc of a circle and are constructed to bear at their free ends against the cam-surfaces of the wheel E in line with the plates $f^2$.

When the wheel E′ is turned to bring the contacts $g'$ upon the plates $f^2$, an electrical circuit will be established, and by turning the wheel one-quarter turn the circuit will be broken.

It will be seen that the line wires $a$ at each side of the base-block connect, respectively, with plates $c$, which have electrical engagement with the inner and outer circles of plates $f^2$, so that the current is transmitted through the contacts $g'$ and rings $g$ from the wires of one side to those of the other.

Having described my invention, what I claim is—

1. The combination, with a frame having a base of insulating material and contact-plates thereon, of a switch portion removably engaging with said contact-plates, and a rotary switch portion coacting with the first-named switch portion, substantially as specified.

2. The combination, with a box or seat, of a base-block, contact-plates therein having spring-clips, a switch portion removably engaging with said clips, and a rotary switch portion coacting with the first-named switch portion, substantially as specified.

3. The combination, with a box or seat and a base-block of vitreous material therein having binding-screws, of a switch consisting of a rotary portion and a stationary portion removably engaging with the base-block, substantially as specified.

4. In a switch, the combination, with the box having the binding-screws and plates therein, a rotary shaft, a wheel of insulating material mounted thereon, contact-plates thereon arranged in two circles, a wheel of insulating material constructed to rotate with the shaft, and curved resilient contacts on said wheel, substantially as specified.

In testimony whereof I have signed my name to this specification in the presence of two subscribing witnesses.

SIGMUND BERGMANN.

Witnesses:
 ORLANDO C. J. SCHARFF,
 D. R. SANFORD.